Jan. 7, 1969               JAMES E. WEBB              3,420,978
ADMINISTRATOR OF THE NATIONAL AERONAUTICS
AND SPACE ADMINISTRATION
PRETREATMENT METHOD FOR ANTI-WETTABLE MATERIALS
Filed June 30, 1965                                               Sheet 1 of 2

Clyde M. Adams, Jr.
Stanley Weiss
              INVENTORS

BY Bernard A. Reiter

ATTORNEYS

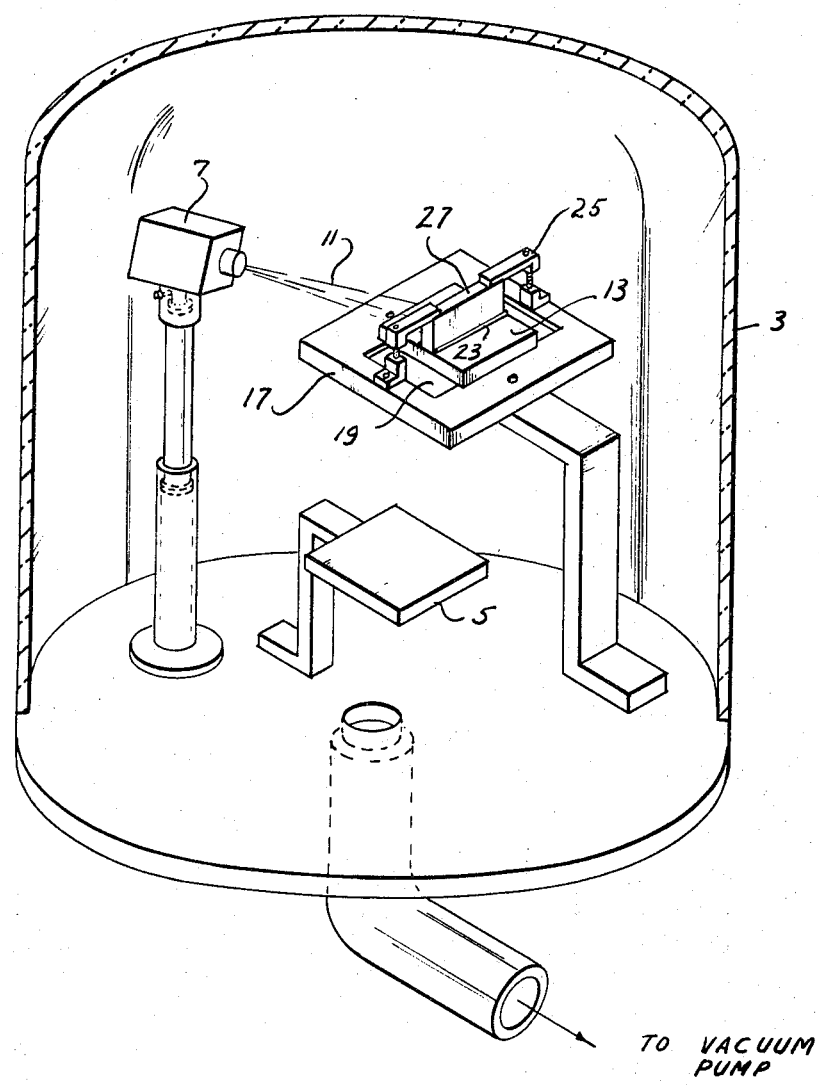

United States Patent Office 3,420,978
Patented Jan. 7, 1969

3,420,978
PRETREATMENT METHOD FOR ANTI-WETTABLE MATERIALS
James E. Webb, Administrator of the National Aeronautics and Space Administration with respect to an invention of Clyde M. Adams, Jr., and Stanley Weiss, both of Lexington, Mass.
Filed June 30, 1965, Ser. No. 468,655
U.S. Cl. 219—121                    13 Claims
Int. Cl. B23k 9/00; B23k 1/04

ABSTRACT OF THE DISCLOSURE

Brazing processes may be conducted on materials having difficult-to-wet surface characteristics such as beryllium by initially treating the surface to be brazed with a vapor deposited coating of titanium or zirconium, approximately two to five microns thickness, applied in a vacuum environment. Subsequently, any appropriate braze filler such as aluminum may be used, also in a vacuum, to complete the braze joint.

---

Figure 1:
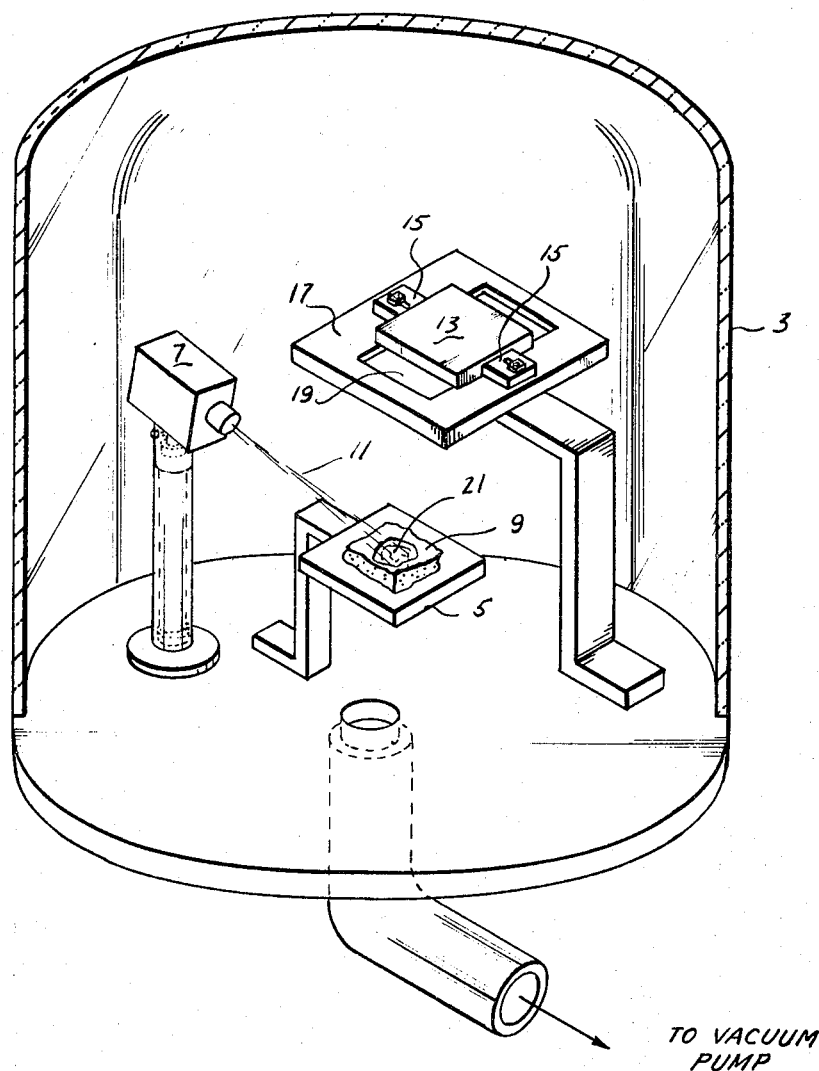

The invention described herein was made in the performance of work under a NASA contract and is subject to the provisions of Section 305 of the National Aeronautics and Space Act of 1958, Public Law 85–568 (72 Stat. 435; U.S.C. 2457).

The present invention is directed to a method for improving the wettability of materials. More particularly, the invention pertains to a surface treatment method for reducing, if not removing, the anti-wetting characteristic of numerous materials, with the principal application being in the treatment of joints preparatory to brazing.

In the joining-by-brazing of two or more pieces of the same material, or of unlike materials, wetting by the brazing alloy or filler over the intended joint must occur in order that the former be introduced completely over the joint. Should the braze filler not flow freely over the intended joint, the subsequent brazement of the pieces will be substantially delineated by the surface area of the filler in its solid state and the resultant joint will quite naturally be of little value. The degree to which the materials permit flow of the braze filler thereover is known as its "wettability" and such characteristic is directly related to the ease and reliability with which a braze joint is made. Although most metals and some nonmetals exhibit a good wetting characteristic, there exists groups of each, which possess a reluctance and in some instances an almost total resistance to it.

Among the metals and metal compounds which clearly exhibit this braze obstruent characteristic, those of beryllium, aluminum oxide, and magnesium oxide are most representative, while in nonmetals, it is most apparent in graphite and glass and for the most part in all ceramic compositions. Several methods for increasing the wettability of materials have been devised in the past but all are deficient in the various aspects discussed hereinafter. As a consequence, there is presently no known method for consistently and easily affecting an operationally reliable brazed joint between two or more pieces of material having strong nonwet characteristics, such as for example, beryllium.

Although the subject invention may be utilized with success in the joining of substantially any difficult-to-wet material, it is discussed and procedurally explained hereinafter in conjunction with beryllium because of the well-known anti-wetting characteristic which this particular material exhibits. It is further discussed and exemplified in conjunction with brazing as a joining process solely because, among the more conventional joining procedures for beryllium, it is considered to present optimal results. It should therefore be recognized that the surface treatment of the invention is suitable as a preparatory step to all those manufacturing processes in which it is desirable, if not necessary, to remove or reduce the anti-wetting nature of the metal or nonmetal worked.

Experience has shown and the state of the art substantiates the fact that metallurgically sound, high strength brazed beryllium joints may not consistently be accomplished for a number of reasons but primarly because of the tightly adhering surface film of beryllium oxide thereon. The film, which increases in amount with temperature elevation, inhibits wetting of the substrate by braze filler, thereby limiting the effective area of the brazement. Attempts to remove it in preparation for brazing have usually included various chem-milling techniques or the use of reagents, both of which methods are found generally deficient in promoting wetting. They are unsatisfactory however in other respects also. Chem-milling, for example, will remove the film but the oxide reforms in such a short time that a braze joint is difficult to accomplish before it reappears. Reagents on the other hand are the source of several problems. Common reagents generally contain one or more metals such as manganese, molybdenum, or titanium, either in pure form as as a halide or hydride. As such, they are used either by pre-positioning on the nonwettable surface or by dissolving in the braze alloy itself. Titanium, for example, is commonly applied as a hydride in the form of a slurry which is spread over the surface. It is found however that the titanium is easily contaminated by the vehicle in which the titanium hydride is suspended and as a consequence a continuous titanium deposit is difficult to achieve. When the titanium is dissolved in the braze alloy, it is found unsatisfactory because an unusually high titanium content is required before satisfactory wettability is achieved. Although wettability may thus be improved, there results an alloy of limited applicability due to the relatively high melting temperature caused by the increased titanium therein.

In addition to the problems of wetability of the materials present, brazing methods are burdened by various temperature ranges of the material used and by the method of achieving such temperature during brazing operations. For example, conventional braze furnaces have relatively slow heating and cooling rates which thus make it difficult to control or prevent grain growth or recrystallization of the base metal. Further handicaps are imposed by the inability of an observer to see the exact melt and flow point of the braze alloy. The importance of such factors is apparent to those who recognize that recrystallization and joint inferiority are a direct function of the heating time and temperature of the braze joint.

The invention described hereinafter obviates not only the anti-wetting characteristics initially noted but also the inferior braze characteristics caused by the comparative absence, heretofore, of control over the magnitude and time factors of the braze temperature. Briefly, the anti-wet characteristic is substantially removed by means of a vacuum deposition technique in which titanium is evaporated by an electron beam and vacuum deposited on the surface to be wet. It is found that this method successfully promotes wetting in all liquid-solid, inorganic systems at temperatures above 1200° F. Once the pieces are coated they may be stored for indefinite periods of time with no regard for oxidation. When desired the parts may be taken from storage and easily brazed due to the wetting action which the material then exhibits. When it is subsequently desired to braze the pieces, the electron beam may again be used. Due to the high heating and cooling rates of the beam, the braze temperatures may be kept at a minimum for the shortest necessary heating period, thereby reducing grain growth and adverse reactions between the filler and base material. These and still other numerous features and advantages of the invention will become readily apparent upon a reading of the following detailed description, claims, and drawings wherein:

FIG. 1 schematically illustrates the apparatus and arrangement thereof used in performing the coating procedure of the instant invention; and FIG. 2 schematically illustrates the apparatus and arrangement thereof used in performing the brazing operation on precoated materials.

In FIG. 1 there is shown a bell jar 3, or other appropriate enclosure for creating a vacuum in which the deposition process may be carried out. Within the enclosure, appropriately positioned with respect to the electron beam gun 7, is a support means 5 made of copper or any other material having good thermal conducting properties. A piece 9 of material known to be good wetting promoter, such as pure titanium (about 20 grams in weight), is placed on support means 5 so as to be in the path of electron beam 11. Positioned generally above the titanium is the material 13, such as beryllium, which is to be coated. If desired, the beryllium may be masked in any suitable manner to prevent coating on certain areas of the surface. The surfaces to be coated should however be disposed in direct relationship to the vapors emitted from the piece of titanium 99. Though numerous holding arrangements are feasible, there is shown a table means 17 having an aperture 19 therein. The beryllium piece is merely positioned over the aperture and clamped in place by tightening means 15. With the titanium and beryllium thus positively located with respect to each other, the pressure in enclosure 3 is brought down to the order of $10^{-4}$ torr or lower. The electron gun is then turned on and beam 11 therefrom is directed upon the center of the titanium piece. The power and other settings for operation of the gun may vary, but generally the beam should be such as to sustain a molten evaporating puddle 21 within titanium 9. Due to the abutting surface contact of the copper support means 5 with the titanium, heat is conducted from the latter and maintains all but its central portion at a comparatively low temperature, thereby facilitating the puddling 21 effect in the center where evaporation takes place. Although satisfactory coating is accomplished with the actual distance of the titanium two or so inches from the beryllium, the optimal distance may vary with the size of the enclosure and other factors and is therefore best determined by experimentation. The beam is directed on the titanium until approximately a 2 to 5 micron coating is deposited on the beryllium surface. The gun is then turned off and the enclosure opened to permit removal of the coated beryllium piece. Although the thickness of the deposit may vary within the stated limits, it should be recognized that an excessively thick deposit will cause formation of titanium compounds with the base material or brazing alloys subsequently used. On the other hand, if the coating is too thin, the desired wetting action will not be achieved.

As previously explained, the beryllium parts may be stored or brazed directly after the coating procedure. As shown in FIG. 2 the coated parts 13 and 27 are placed in the desired position with respect to each other and firmly clamped in place by a vise 25 or other holding means. An appropriate braze filler 23, such as aluminum, is then placed in abutting relation with the intended joint. Once the pieces are appropriately positioned, the enclosure is again secured and pumped down to a vacuum of about $10^{-4}$ torr or below. An oscillating type, low voltage electron beam is then directed on the appropriate areas until the intended brazement is accomplished. Specific power and control settings are not set forth herein, merely because such are well-known in the art but also because of their dependence on factors such as the type of substrate materials, filler, and size of the brazement.

The method described is found, without exception, to promote a highly favorable wetting response by any liquid metal on a solid substrate at temperatures over 1200° F. Among the many normally hard-to-wet materials believed subject to the instant invention are aluminum oxide, magnesium oxide, beryllium oxide, titanium oxide, uranium oxide, aluminum silicate, zirconium silicate, magnesium silicate, graphite, tungsten carbide, tantalum carbide, silicon carbide, uranium carbide, glass, and ceramic oxides. Also included are any heat resistant stainless or corrosion resisting alloys founded upon a chromium content exceeding 13%, which is hard-to-wet.

Those skilled in the art will, as inferred above, recognize the appropriate alloy fillers to be used for brazing of difficult-to-wet materials. By way of example, however, it is found that beryllium parts treated in accordance with the method explained hereinbefore have been best joined using high purity aluminum as the filler metal. Subsequent examination of such a joint has shown there is no significant reaction between the metals and also there is a substantial absence of any intermetallic compounds. Although optimal wetting took place at 1730° F., it was found that good wetting occurred at 1550° F. to 1650° F., both of which temperatures are substantially below the recrystallization range. This is, of course, due to the accelerated heating and consequent cooling cycle made possible by use of the electron beam gun.

Despite the optimal results obtained by the use of the electron gun, it should be recognized that actual brazing of the substrate may be accomplished by other means such as resistance heating, radiant heating, or inductive heating in a vacuum or controlled atmosphere. Likewise any means, such as chemical vapor deposition by which a clean, continuous film of titanium or other wetting promoter such as zirconium could be deposited, would be satisfactory. The use of a low voltage electron gun, however, set with a beam power of about 3 kilowatts at 10,000 volts is preferred over other heat source means, both for the vaporization and brazing operations. It is found during the brazing step that by the directing of a partially focused beam on a spot ¼" to ½" in diameter and electromagnetically deflecting or oscillating it, there results a uniform simultaneous heating of the parts.

Similarly, it should also be noted that brazing is not the sole operation to which the instant invention may be applied. Thus it may, for example, find application in the production of bi-metallic structures produced by casting a liquid against a higher melting point solid, such as in the manufacture of composite iron aluminum brake assemblies, where it is desired that the aluminum repose in wetted contact against the iron for mechanical and heat transfer purposes. It might also find application in the coating of solids by liquid metals wherein wetting is an essential requirement.

Having thus described the invention with particularity, with reference to the preferred embodiment of the same, and having referred to exemplary applications in which it may be used, it will be obvious to those skilled in the art that other modifications and changes may be made therein without departing from the spirit and scope of it. The claims appended hereto are therefore intended to cover not only said preferred form but also the numerous applications of the invention and the various modifications within its spirit and scope.

What is claimed and desired to be secured by Letters Patent is:

1. The method of reducing the difficult-to-wet surface characteristic of a material, comprising the steps of:
   placing the material that is to be prepared having a difficult-to-wet surface characteristic in a vacuum chamber with appropriate quantity of titanium;
   lowering the pressure of the chamber to about $10^{-4}$ torr or below and then heating said titanium so as to cause it to vaporize and deposit a coating of approximately 2–5 microns thickness on said material; and turning off the heat and bringing the chamber to atmospheric temperature and pressure to permit removal of the coated material therefrom.

2. The method of reducing the difficult-to-wet surface characteristic of a material, comprising the steps of:
   placing the material that is to be prepared having difficult-to-wet surface characteristics in a vacuum chamber with an appropriate quantity of zirconium;
   lowering the pressure of the chamber to about $10^{-4}$ torr or below and then heating said zirconium so as to cause it to vaporize and deposit a coating of approximately 2–5 microns thickness on said material; and
   turning off the heat and bringing the chamber to atmospheric temperature and pressure to permit removal of the material therefrom.

3. The method of preparing for brazing beryllium metal comprising the steps of:
   placing the beryllium and a piece of titanium within a vacuum chamber, said piece of titanium being positioned generally below the materials;
   lowering the pressure of the chamber about $10^{-4}$ torr and then heating said titanium so as to cause it to vaporize and deposit a coating of approximately 2–5 microns thickness on said beryllium; and
   turning off the heat and bringing the chamber to atmospheric temperature and pressure to permit removal of the beryllium therefrom.

4. The method of preparing for brazing those materials which possess a difficult-to-wet surface characteristic, comprising the steps of:
   placing the material to be prepared having difficult-to-wet surface characteristics in a vacuum chamber with an appropriate quantity of titanium, said quantity of titanium being positioned generally below said material;
   lowering the pressure of the chamber to about $10^{-4}$ torr and then directing a beam of electrons onto the titanium so as to maintain a small molten puddle therein, thus causing the titanium to evaporate and deposit a coating of approximately 2–5 microns thickness on the difficult-to-wet material; and
   turning off the beam of electrons and bringing the chamber to atmospheric temperature and pressure to permit removal of the coated material therefrom.

5. The method of preparing for brazing those materials which possess a difficult-to-wet surface characteristic, comprising the steps of:
   placing the material to be prepared having difficult-to-wet surface characteristics in a vacuum chamber with an appropriate quantity of zirconium, said quantity of zirconium being position generally below said material;
   lowering the pressure of the chamber to about $10^{-4}$ torr or below and then directing a beam of electrons onto the zirconium and maintaining a small molten puddle therein, thus causing it to evaporate and deposit a coating of approximately 2–5 microns thickness on the difficult-to-wet material; and turning off the beam of electrons and bringing the chamber to atmospheric temperature and pressure to permit removal of the material therefrom.

6. The method of preparing for brazing the metal beryllium comprising the steps of:
   placing the beryllium and a piece of titanium within a vacuum chamber;
   lowering the pressure of the chamber to about $10^{-4}$ torr or below and then directing a beam of electrons onto said piece of titanium, thereby causing a small molten puddle to give forth sufficient titanium vapor to deposit a coating of approximately 2–5 microns thickness on the beryllium surfaces; and
   turning off the beam of electrons and bringing the chamber to atmospheric temperature and pressure so as to permit removal of the beryllium therefrom.

7. The method of preparing for brazing the metal beryllium, comprising the steps of:
   placing the beryllium and a piece of titanium within a vacuum chamber, said piece of titanium being positioned generally below the beryllium;
   lowering the pressure of the chamber to about $10^{-4}$ torr and then directing a beam of electrons onto said piece of titanium, thereby causing a small molten puddle to give forth titanium vapor;
   maintaining the evaporation of the titanium by the electron beam until about a 2 to 5 micron coating is deposited on the surface of said beryllium; and
   turning off the beam of electrons and bringing the chamber to atmospheric temperature and pressure so as to permit removal of the beryllium therefrom.

8. The method of brazing those materials which possess a difficult-to-wet surface characteristic, comprising the steps of:
   placing the material to be brazed having a difficult-to-wet surface characteristic in a vacuum chamber with an appropriate quantity of titanium, said quantity of titanium being positioned generally below said material;
   lowering the pressure of the chamber to about $10^{-4}$ torr and then heating said titanium so as to cause it to vaporize and deposit a coating of approximately 2–5 microns thickness on said material;
   positioning those materials to be brazed including the titanium deposited material in appropriate relationship to each other and placing the braze filler on the intended joint;
   heating said joint sufficiently to cause said filler to flow, thereby brazing said materials together; and
   turning off the heat and bringing the pressure of the chamber to atmospheric level thereby permitting removal of the brazed materials.

9. The method of brazing those materials which possess a difficult-to-wet surface characteristic, comprising the steps of:
   with an appropriate quantity of zirconium, said quantity of zirconium being positioned generally below said materials;
   lowering the pressure of the chamber to about $10^{-4}$ torr and then heating said zirconium so as to cause it to vaporize and deposit a coating of approximately 2–5 microns thickness on said materials;
   turning off the heat to permit rearranging of said materials for brazing;
   positioning those materials to be brazed including the zirconium deposited materials in a brazing relationship to each other and placing a braze filler on the intended joint;
   heating the joint and said filler to cause the latter to flow over said materials and joint; and
   turning off the heat and bringing the pressure of the chamber to atmospheric level thereby permitting removal of the brazed materials.

10. The method of brazing those materials having difficult-to-wet surface characteristics comprising the steps of:
    placing the material to be brazed having difficult-to-wet surface characteristics in a vacuum chamber with an appropriate quantity of titanium;
    lowering the pressure of the chamber to about $10^{-4}$ torr and then directing a beam of electrons onto the titanium and maintaining a small molten puddle therein thus causing the titanium to evaporate and deposit a coating of approximately 2–5 microns thickness on said material;
    turning off the beam of electrons to allow cooling of said material;
    bringing the chamber to atmospheric pressure to permit repositioning of said material in preparation for brazing;

positioning those materials to be brazed including the titanium deposited materials to form a joint;

placing a braze filler on the joint and again lowering the pressure to about $10^{-4}$ torr or below;

directing an oscillating electron beam onto said joint to heat it thereby causing said filler to flow thereover; and turning off the beam of electrons when the joint is brazed and bringing the pressure of the chamber to atmospheric level thereby permitting removal of the brazed material pieces therefrom.

11. The method of brazing beryllium to another material comprising the steps of:

placing the beryllium and a piece of titanium within a vacuum chamber;

lowering the pressure of the chamber to about $10^{-4}$ torr or below and then heating the titanium so as to cause it to vaporize and deposit a coating of approximately 2–5 microns thickness on said beryllium;

turning off the heat and bringing chamber to atmospheric pressure, removing the titanium therefrom;

placing the beryllium in contacting relation to said other material to thereby form a joint;

placing the braze filler on said joint and lowering the pressure of the chamber to about $10^{-4}$ torr or below;

heating the joint to thereby cause the filler to flow thereover; and turning off the heat and bringing the pressure to atmospheric level thereby permitting removal of the brazed pieces.

12. The method of brazing those materials having a difficult-to-wet surface characteristic, comprising the steps of:

placing pieces of the material having a difficult-to-wet surface characteristic in a vacuum chamber with an appropriate quantity of zirconium;

lowering the pressure of the chamber to about $10^{-4}$ torr or below and then directing a beam of electrons onto the zirconium and maintaining a small molten puddle therein thus causing sufficient evaporation and subsequent deposition on the material pieces to provide a surface coating of approximately 2–5 microns thickness thereon;

turning off the beam of electrons to allow cooling of the material pieces and bringing the chamber to atmospheric pressure to permit repositioning of the material for brazing;

positioning those materials to be brazed including the zirconium deposited materials so as to form the intended joint;

place the braze filler on said joint and lowering the pressure to at least $10^{-4}$ torr;

directing an oscillating beam of electrons onto the joint to thereby cause the filler to flow thereover; and turning off the electron beam and bringing the pressure of the chamber to atmospheric level thereby permitting removal of the brazed material pieces therefrom.

13. The method of brazing the metal beryllium, comprising the steps of:

placing the beryllium pieces and a piece of titanium within a vacuum chamber;

lowering the pressure of the chamber to at least $10^{-4}$ torr and then directing a beam of electrons onto the titanium and maintaining a small molten puddle therein thus causing the titanium to evaporate and deposit a coating of approximately 2–5 microns thickness on the beryllium pieces;

turning off the beam of electrons to allow cooling of the beryllium pieces and bringing the chamber to atmospheric pressure to permit repositioning of the pieces for brazing;

positioning the pieces in appropriate relation to each other to form the intended joint;

placing the braze filler on said joint, closing the chamber and lowering the pressure to at least $10^{-4}$ torr;

directing an oscillating beam of electrons onto the joint to thereby cause the filler to flow thereover; and stopping the beam of electrons and bringing the pressure of the chamber to atmospheric level thereby permitting removal of the brazed material pieces therefrom.

References Cited

UNITED STATES PATENTS

| | | | |
|---|---|---|---|
| 2,465,713 | 3/1949 | Dimmick | 117—93.3 |
| 2,768,271 | 10/1956 | Meredith | 219—85 |
| 2,771,568 | 11/1956 | Steigerwald | 219—121 |
| 2,944,172 | 7/1960 | Opitz et al. | |
| 3,135,855 | 6/1964 | Barber. | |
| 3,151,231 | 9/1964 | Steigerwald. | |
| 3,161,950 | 12/1964 | Cobb | 219—121 |
| 3,162,767 | 12/1964 | Di Curcio et al. | 117—93.3 |
| 3,183,563 | 5/1965 | Smith | 219—121 |
| 3,275,789 | 9/1966 | Lloyd et al. | 219—85 |
| 3,276,902 | 10/1966 | Abraham | 219—121 |

RICHARD M. WOOD, *Primary Examiner.*

W. D. BROOKS, *Assistant Examiner.*

U.S. Cl. X.R.

219—85; 117—93